(12) United States Patent
Somani et al.

(10) Patent No.: US 11,233,450 B2
(45) Date of Patent: Jan. 25, 2022

(54) MULTI-OUTPUT POWER SUPPLY WITH DUAL POWER-ON CONTROL

(71) Applicant: Hamilton Sundstrand Corporation, Charlotte, NC (US)

(72) Inventors: Vaibhav Kumar Somani, Karnataka (IN); William E. Villano, Canton, CT (US); Alagan Thiruvarul Selvakkumaran Sathyan, Tamilnadu (IN); Raviprakash Yadav, Karnataka (IN); Ishwar Bhat, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/951,270

(22) Filed: Nov. 18, 2020

(65) Prior Publication Data
US 2021/0351691 A1    Nov. 11, 2021

(30) Foreign Application Priority Data
May 11, 2020 (IN) .............................. 202011019857

(51) Int. Cl.
*H02M 3/04* (2006.01)
*H02M 7/04* (2006.01)

(52) U.S. Cl.
CPC .............. *H02M 3/04* (2013.01); *H02M 7/04* (2013.01)

(58) Field of Classification Search
CPC ........... H02M 3/158; H02M 3/22; H02M 3/24
See application file for complete search history.

(56) References Cited

U.S. PATENT DOCUMENTS

| | | | |
|---|---|---|---|
| 8,022,683 B2* | 9/2011 | Thompson | H02M 3/158 323/285 |
| 8,456,867 B1 | 6/2013 | Karlsson et al. | |
| 8,648,629 B2 | 2/2014 | Rossi et al. | |
| 9,310,863 B2 | 4/2016 | Karimiam-Kakolaki et al. | |
| 9,641,166 B2 | 5/2017 | Devarajan et al. | |
| 9,904,556 B1 | 2/2018 | Ellerbrock et al. | |
| 10,771,055 B2* | 9/2020 | Olyunin | H03K 17/08104 |
| 2007/0210774 A1 | 9/2007 | Kimura et al. | |
| 2008/0062729 A1 | 3/2008 | Kanai et al. | |
| 2010/0290257 A1 | 11/2010 | Asinovski et al. | |

OTHER PUBLICATIONS

EP Application No. 21173413.2 Extended EP Search Report dated Sep. 13, 2021, 8 pages.

* cited by examiner

Primary Examiner — Hai L Nguyen
(74) Attorney, Agent, or Firm — Cantor Colburn LLP (57) ABSTRACT

According to an aspect, a power supply is provided. The power supply includes a plurality of voltage converters including a first voltage converter and one or more other voltage converters. The power supply also includes a power supply control configured to perform a plurality of operations including enabling the first voltage converter during a start-up mode of operation, monitoring and regulating an output of the first voltage converter, reconfiguring the power supply control to enable the one or more other voltage converters based on determining that the output of the first voltage converter meets a regulation threshold, and transitioning from the start-up mode of operation to a regular mode of operation based on enabling the one or more other voltage converters to output one or more regulated voltages by the power supply.

20 Claims, 10 Drawing Sheets

MULTI-OUTPUT POWER SUPPLY WITH DUAL POWER-ON CONTROL

FOREIGN PRIORITY

This application claims priority to India Patent Application No. 202011019857 filed May 11, 2020, the entire contents of which is incorporated herein by reference.

BACKGROUND

The subject matter disclosed herein generally relates to the field of electronic systems, and more particularly to a multi-output power supply with dual power-on control.

Electronic systems, such as control systems, may require multiple voltage rails to be regulated at predetermined levels to maintain proper operation. Further, in safety-critical systems, there can be multiple power conditioning requirements defined across a range of operating conditions. Such systems may be powered by different sources, such as a generator, a battery, a supercapacitor, an ultracapacitor, a thermal electric system, a fuel cell, ground-based power, and the like. Power demands of electronic systems can also vary and may be required to accommodate short interruptions in power and various changes in loads during start-up, normal, and diagnostic modes of operation.

In systems with greater power demands that supply multiple regulated voltages, high-power rated and bulky components may be needed. Multiple output power supplies often require multiple controllers. The initial bias voltage to these controllers is generally provided by a bootstrap start-up circuit at the time of power on operation. The power required for initial biasing of multiple controllers can make the bootstrap startup circuits bulky. To meet system power requirements, power supply conditioning circuitry can impact the total weight, heat generation, and power consumption of the system into which the power supply conditioning circuitry is integrated. In applications, such as aerospace applications, these factors as well as safety and reliability can constrain the overall system design.

BRIEF SUMMARY

According to one embodiment, a power system is provided. The power supply includes a plurality of voltage converters including a first voltage converter and one or more other voltage converters. The power supply also includes a power supply control configured to perform a plurality of operations including enabling the first voltage converter during a start-up mode of operation, monitoring and regulating an output of the first voltage converter, reconfiguring the power supply control to enable the one or more other voltage converters based on determining that the output of the first voltage converter meets a regulation threshold, and transitioning from the start-up mode of operation to a regular mode of operation based on enabling the one or more other voltage converters to output one or more regulated voltages by the power supply.

In addition to one or more of the features described above, or as an alternative, further embodiments may include a non-volatile storage device including a first set of configuration data and at least a second set of configuration data.

In addition to one or more of the features described above, or as an alternative, further embodiments may include where enabling the first voltage converter is based on the power supply control receiving the first set of configuration data from the non-volatile storage device.

In addition to one or more of the features described above, or as an alternative, further embodiments may include where reconfiguring the power supply control to enable the one or more other voltage converters is based on the power supply control receiving the second set of configuration data from the non-volatile storage device.

In addition to one or more of the features described above, or as an alternative, further embodiments may include where the power supply control is configured to transition from the regular mode of operation to the start-up mode of operation prior to depowering based on detecting a power shutdown event.

In addition to one or more of the features described above, or as an alternative, further embodiments may include where the regular mode of operation includes the first voltage converter meeting the regulation threshold and the one or more other voltage converters meeting one or more corresponding regulation thresholds.

In addition to one or more of the features described above, or as an alternative, further embodiments may include a diode-or circuit coupled to the output of the first voltage converter, where an output of the diode-or circuit is coupled to a local regulator configured to power the power supply control, and a start-up bootstrap circuit coupled to the diode-or circuit and a power input.

In addition to one or more of the features described above, or as an alternative, further embodiments may include where the power supply control is configured to monitor and regulate each output of two or more voltage converters.

In addition to one or more of the features described above, or as an alternative, further embodiments may include where the power supply control includes an independent pulse width modulation controller for each of the first voltage converter and the one or more other voltage converters, and the power supply control comprises at least one analog-to-digital converter configured to monitor the output of the first voltage converter and the one or more other voltage converters.

In addition to one or more of the features described above, or as an alternative, further embodiments may include where the output of the first voltage converter provides input power to at least one of the one or more other voltage converters.

According to an embodiment, a method includes enabling, by a power supply control of a power supply, a first voltage converter during a start-up mode of operation. An output of the first voltage converter is monitored and regulated. The power supply control is reconfigured to enable one or more other voltage converters based on determining that the output of the first voltage converter meets a regulation threshold. The power supply control can transition from the start-up mode of operation to a regular mode of operation based on enabling the one or more other voltage converters to output one or more regulated voltages by the power supply.

In addition to one or more of the features described above, or as an alternative, further embodiments may include accessing a non-volatile storage device including a first set of configuration data and at least a second set of configuration data.

In addition to one or more of the features described above, or as an alternative, further embodiments may include transitioning from the regular mode of operation to the start-up mode of operation prior to depowering based on detecting a power shutdown event.

In addition to one or more of the features described above, or as an alternative, further embodiments may include delivering power from a power input to a start-up bootstrap circuit coupled to a diode-or circuit, delivering power from the first voltage converter to the diode-or circuit, and providing power from an output of the diode-or circuit to a local regulator configured to power the power supply control.

In addition to one or more of the features described above, or as an alternative, further embodiments may include monitoring and regulating each output of two or more voltage converters by the power supply control.

Technical effects of embodiments of the present disclosure include a power supply with dual power-on control that reduces power consumption during start up bootstrap operation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
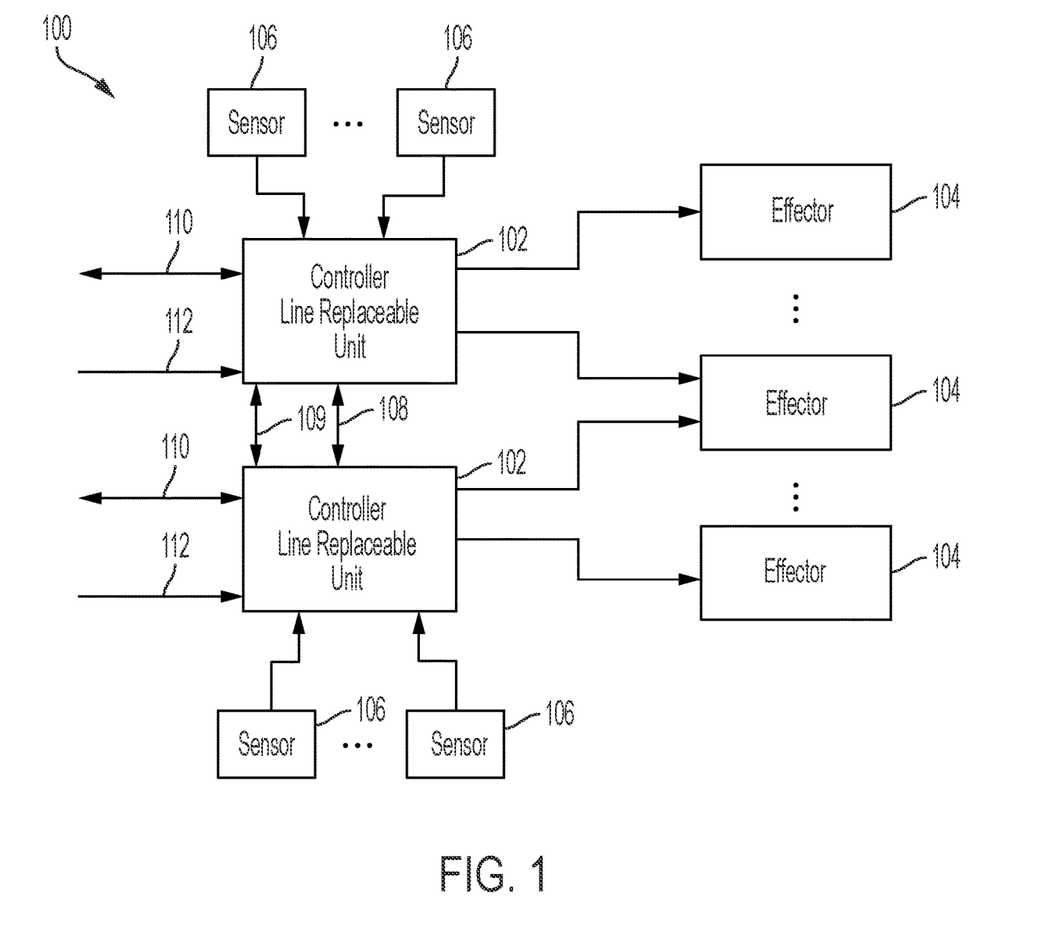
FIG. 1 is a schematic representation of a control system, according to an embodiment of the present disclosure.

FIG. 1 is a schematic representation of a control system 100 including a plurality of controller line replaceable units (LRUs) 102 operable to control one or more effectors 104 and monitor one or more sensors 106. The term "LRU" refers to a component that is designed to be rapidly replaced at an operating location in the field with an equivalent component to restore operational performance, typically with quick-release fittings and minimal tooling requirements. The example of FIG. 1 is a dual-channel control system, where the controller LRUs 102 can exchange data with each other on a cross-channel data link and cross-channel status discretes 108. Power exchange between the controller LRUs 102 can be performed through the cross-channel status discretes 108 or through one or more power exchange links 109. In some embodiments, one of the controller LRUs 102 can provide a regulated or converted voltage to other LRUs 102 and/or other subcomponents. The controller LRUs 102 may also interface with one or more external systems (not depicted) via communication links 110 to receive and send data and commands external to the control system 100. The controller LRUs 102 can receive power inputs 112, which may include power and status discrete signals. As one example, the control system 100 can be part of an aircraft, such as a flight control system, propulsion control system, environmental control system, or other such system. Alternatively, the control system 100 can be incorporated in industrial machinery, an elevator system, a vehicle system, or other such systems with safety-critical applications.

The power inputs 112 can be, for example, various direct current (DC) and/or alternating current (AC) sources. As one example, the power inputs 112 can include aircraft power regulated at about 28 volts DC and various power supply status signals, such as a power supply reset, a power-on reset, a power shutdown, and other such signals. Various power sources of the power inputs 112 can come from other components of the higher-level system into which the control system 100 is integrated. For example, power sources can include one or more of a generator, a battery, a supercapacitor, an ultracapacitor, a thermal electric system, a fuel cell, ground-based power, and the like.

The effectors 104 can be any type of electrical or electro-mechanical actuation devices/systems. For instance, the effectors 104, can be solenoids, relays, motors, pumps, valves, indicators, or other such devices capable of controlling position, pressure, or motion, including discrete, linear, rotary, and/or oscillatory responses. One or more of the effectors 104 can be a single channel effector controlled by one of the controller LRUs 102, and one or more of the effectors 104 can be a multi-channel effector controlled by two or more of the controller LRUs 102. For instance, a multi-channel effector 104 may be controlled by two or more controller LRUs 102 providing a partial command/current source or a single one of the controller LRUs 102 providing a full command/current source.

The sensors 106 can be any type of sensing device to observe feedback and conditions for control and monitoring purposes. For example, the sensors 106 can include linear position sensors, rotatory position sensors, pressure sensors, flow rate sensors, current sensors, voltage sensors, level sensors, accelerometers, photovoltaic sensors, discrete inputs, and other such sensing devices known in the art. The sensors 106 can include substantially redundant information provided to each of the controller LRUs 102 to support voting or blending of multiple observed values, for instance, where cross-channel data values are exchanged between the controller LRUs 102 on the cross-channel data link and cross-channel status discretes 108.

The communication links 110 can report data and status observed by the controller LRUs 102 to a higher-level control or data management system. For example, in the context of an aircraft, the communication links 110 can interface with an air data computer, cockpit instrumentation, a vehicle system bus, and/or other interfaces operable to command actions by the controller LRUs 102 and process data and status generated by the controller LRUs 102.

Figure 2:
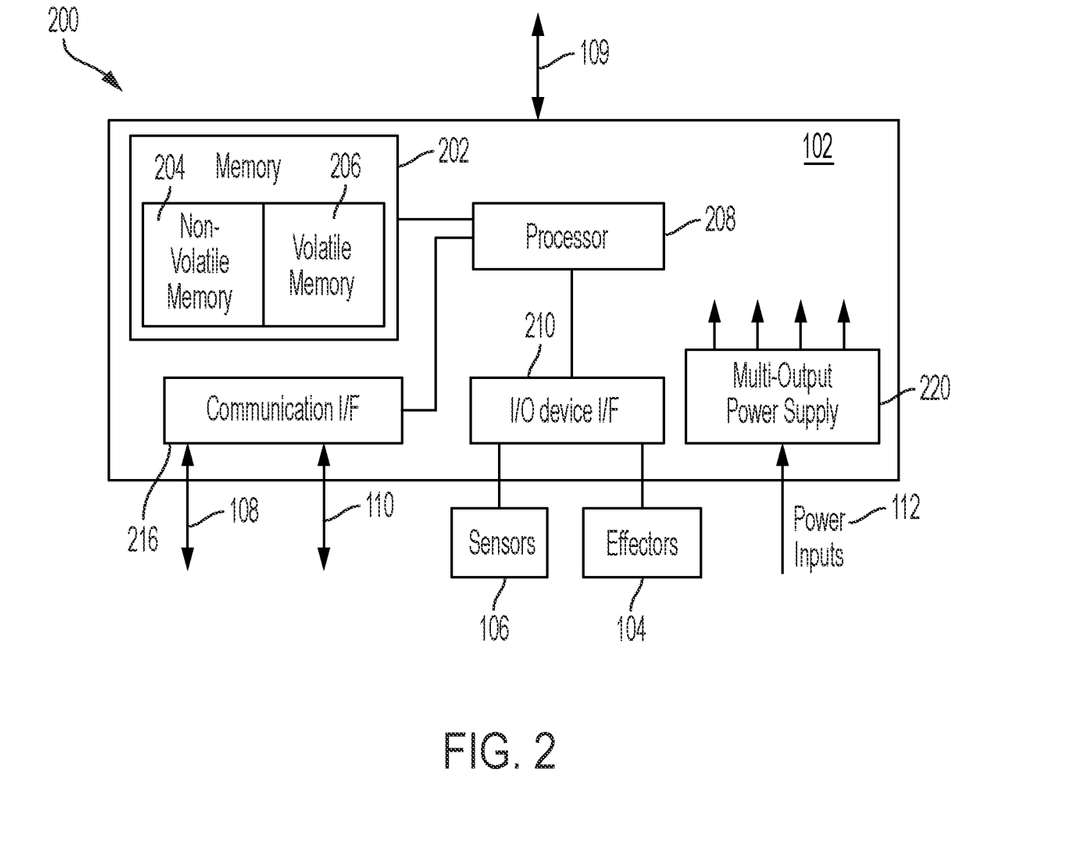
FIG. 2 is a block diagram of a channel of a control system, according to an embodiment of the present disclosure.

Referring now to FIG. 2, a portion of a channel 200 of the control system 100 of FIG. 1 including an exemplary controller LRU 102 of the present disclosure is shown. The controller LRU 102 can include a memory 202 which can store executable instructions and/or data associated with operation of various systems, such as aircraft systems. The executable instructions can be stored or organized in any manner and at any level of abstraction, such as in connection with one or more applications, processes, routines, procedures, methods, etc. As an example, at least a portion of the instructions and associated data can be initially stored in non-volatile memory 204 of the memory 202 and transferred to volatile memory 206 of the memory 202 for faster execution, record creation, and the like. Volatile memory 206 typically loses its state upon a shutdown or absent sufficient memory refreshing. Non-volatile memory 204 is persistent and maintains state between shutdown and startup.

Further, as noted, the memory 202 may store data. The data may include, but is not limited to, sensor data, event data, time history data, fault data, or any other type(s) of data as will be appreciated by those of skill in the art. The instructions stored in the memory 202 may be executed by one or more processors, such as a processor 208. The processor 208 may be operative on the data.

The processor 208, as shown, is coupled to one or more input/output (I/O) device interfaces 210 operable to receive sensor data from sensors 106 and/or command one or more effectors 104. The sensors 106 and effectors 104 can include any types known in the art for controlling and/or monitoring the health of aircraft components and systems, for instance.

The components of the controller LRU 102 may be operably and/or communicably connected through a communication interface 216 by one or more buses that can include, for instance, cross-channel status discretes 108 and communication links 110 of FIG. 1 in some embodiments. The controller LRU 102 may further include other features or components as known in the art. For example, the controller LRU 102 may include one or more transceivers and/or devices configured to transmit and/or receive information or data from sources external to the controller LRU 102 (e.g., through the I/O device interface 210). Information received over the communication links 110 can be stored in the memory 202 and/or may be processed and/or employed by one or more programs or applications and/or the processor 208.

Power inputs 112 can be further processed by a multi-output power supply 220 of the controller LRU 102 to provide various voltage levels needed within the controller LRU 102. For example, various voltage rails at different levels may be needed to support the memory 202, processor 208, I/O device interface 210, and communication interface 216. Further, these regulated voltages may supply the other sub component of another LRU 102 through a power exchange link 109. Further, the multi-output power supply 220 may have changing current demands depending on a mode of operation and the ability of another channel 200 to control effectors 104 in an active-active or active-standby configuration.

Figure 3:
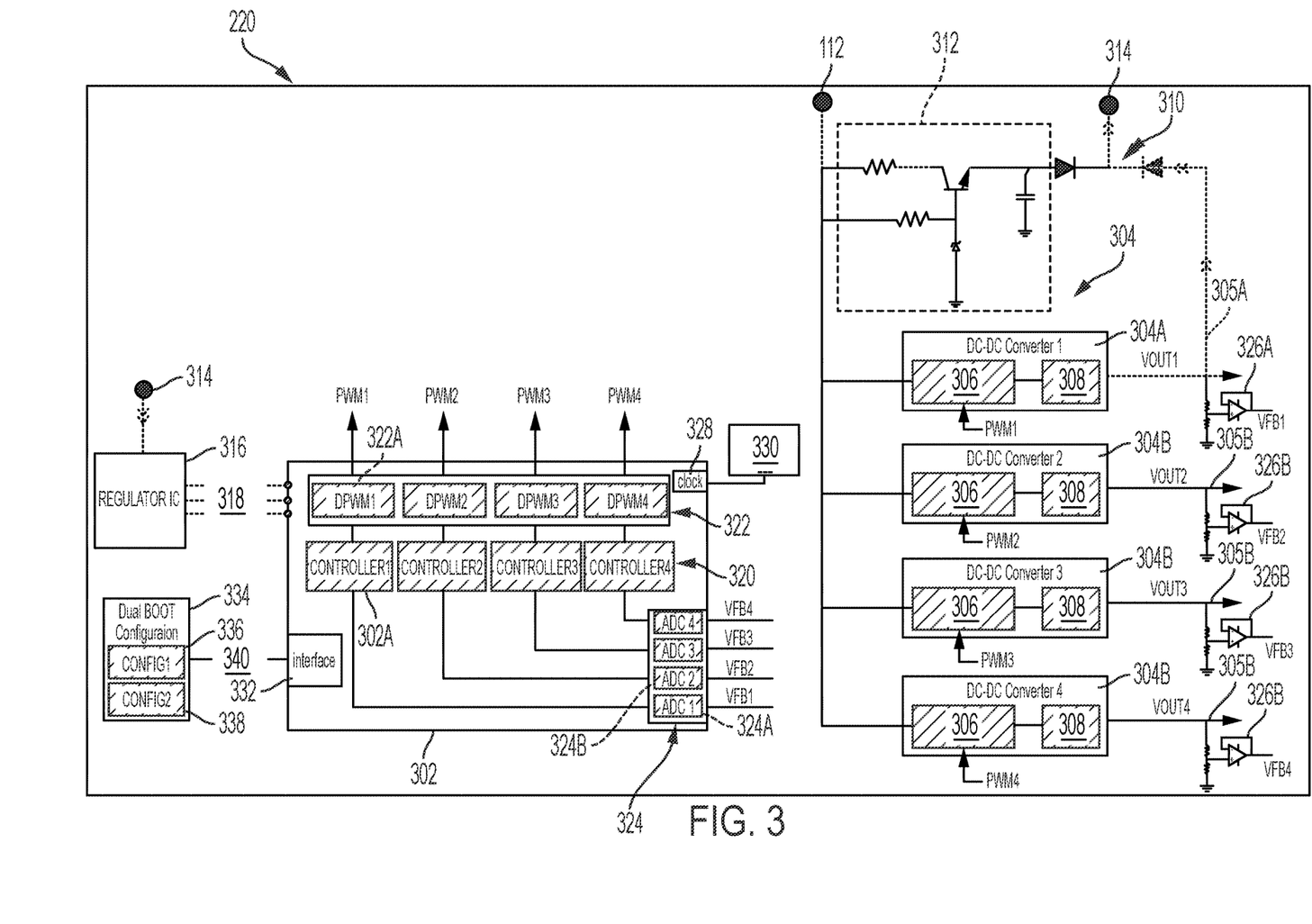
FIG. 3 is a block diagram of a multi-output power supply, according to an embodiment of the present disclosure.

FIG. 3 is an example of the multi-output power supply 220 of FIG. 2 in more detail. In the example of FIG. 3, a power supply control 302 is depicted that is configurable to control a plurality of voltage converters 304. The voltage converters 304 can be, DC-DC, AC-DC, or DC-AC converters that produce regulated voltage or current outputs at different levels to support operation of the channel 200 of FIG. 2. Further, outputs of the voltage converters 304 may be used for motor drives, front-end converters, other LRUs 102, and various subcomponents, for instance, as output on one or more power exchange links 109 of FIGS. 1 and 2. Each of the voltage converters 304 can include known components, such as a half-bridge circuit 306 and a filter 308. The voltage converters 304 can receive power from the power inputs 112. Control signals from the power supply control 302 can determine a percentage of the power from the power inputs 112 to pass through and condition as regulated voltage outputs. For example, the power supply control 302 can independently control each of the pulse width modulation signals having duty cycles corresponding to a desired voltage level of each regulated voltage output. Rather than enabling all of the voltage converters 304 upon start-up, the power supply control 302 can initially enable a first voltage converter 304A in a start-up mode of operation while one or more other voltage converters 304B remain disabled. A diode-or circuit 310 can be coupled to an output 305A of the first voltage converter 304A. A start-up bootstrap circuit 312 can be coupled to the diode-or circuit 310 and a power input of the power inputs 112. The start-up bootstrap circuit 312 can supply initial bias voltage with a passively controlled voltage to an output 314 of the diode-or circuit 310 until the output 305A of the first voltage converter 304A meets a regulation threshold, such as being above a minimum voltage threshold to deliver power to the diode-or circuit 310 and output 314.

The output 314 of the diode-or circuit 310 can be coupled to a local regulator 316 configured to power the power supply control 302 with a plurality of local voltage levels 318. In embodiments, the power supply control 302 can be an application specific integrated circuit (ASIC), a field programmable gate array (FPGA), or the like, which includes basic logic functions and/or gates to rapidly configure the voltage converters 304 without extended delays or complexity that may be associated with a microprocessor-based solution. The power supply control 302 can include a plurality of modulation controllers 320 with configurable digital pulse-width modulation circuits 322. The power supply control 302 can include at least one analog-to-digital converter 324 configured to monitor the output 305A of the first voltage converter 304A and outputs 305B of the one or more other voltage converters 304B. The output 305A and outputs 305B are examples of regulated voltages output by the multi-output power supply 220. Buffer circuits 326A and 326B can be respectively coupled between the outputs 305A, 305B and analog-to-digital converters 324A, 324B to condition the signals to be monitored by the modulation controllers 320.

In the example of FIG. 3, there are four independently controlled voltage converters 304; however, it will be understood that there can be any number of voltage converters 304 at or above two. Further, although four analog-to-digital converters 324 are depicted within the power supply control 302 to independently monitor the outputs 305A, 305B in parallel, it will be understood that other configurations can be implemented, such as one or more multiplexed analog-to-digital converters internal or external to the power supply control 302. Further, the power supply control 302 can include other support elements, such as a clock 328 that receives input from an oscillator 330. The power supply control 302 can also include an interface 332 coupled to a non-volatile storage device 334. The non-volatile storage device 334 can store a first set of configuration data 336 and a second set of configuration data 338. The non-volatile storage device 334 can be part of the non-volatile memory 204 of FIG. 2 or a dedicated device accessible through a local bus 340, such as a serial peripheral interface bus. The first set of configuration data 336 may be referred to as BOOT configuration 1 that can enable modulation controller 320A, configurable digital pulse-width modulation circuit 322A, the first voltage converter 304A, and analog-to-digital converter 324A. The second set of configuration data 338 may be referred to as BOOT configuration 2 that can enable all of the modulation controllers 320, configurable digital pulse-width modulation circuits 322, voltage converters 304, and analog-to-digital converter 324. Therefore, when the power supply control 302 is configured with BOOT configuration 1, the multi-output power supply 220 operates with reduced power consumption as compared with BOOT configuration 2. Notably, with BOOT configuration 1, the output 314 of the diode-or circuit 310 is powered by the bootstrapping circuit 312 until the first voltage converter 304A provides a stable regulated value at output 305A. Upon transitioning from BOOT configuration 1 to BOOT configuration 2, the first voltage converter 304A continues to power the output 314. Further details are provided with respect to FIGS. 4-8. Although only two sets of configuration data 336, 338 are depicted in FIG. 3, it will be understood that additional configuration data sets can be used to support additional configurations. Similarly, in some embodiments, different numbers of supporting interfaces can be included, such as different numbers of modulation controllers 320, configurable digital pulse-width modulation circuits 322, analog-to-digital converters 324, and the like. Further, there can be spare interfaces to support reconfiguration across multiple designs.

Figure 4:
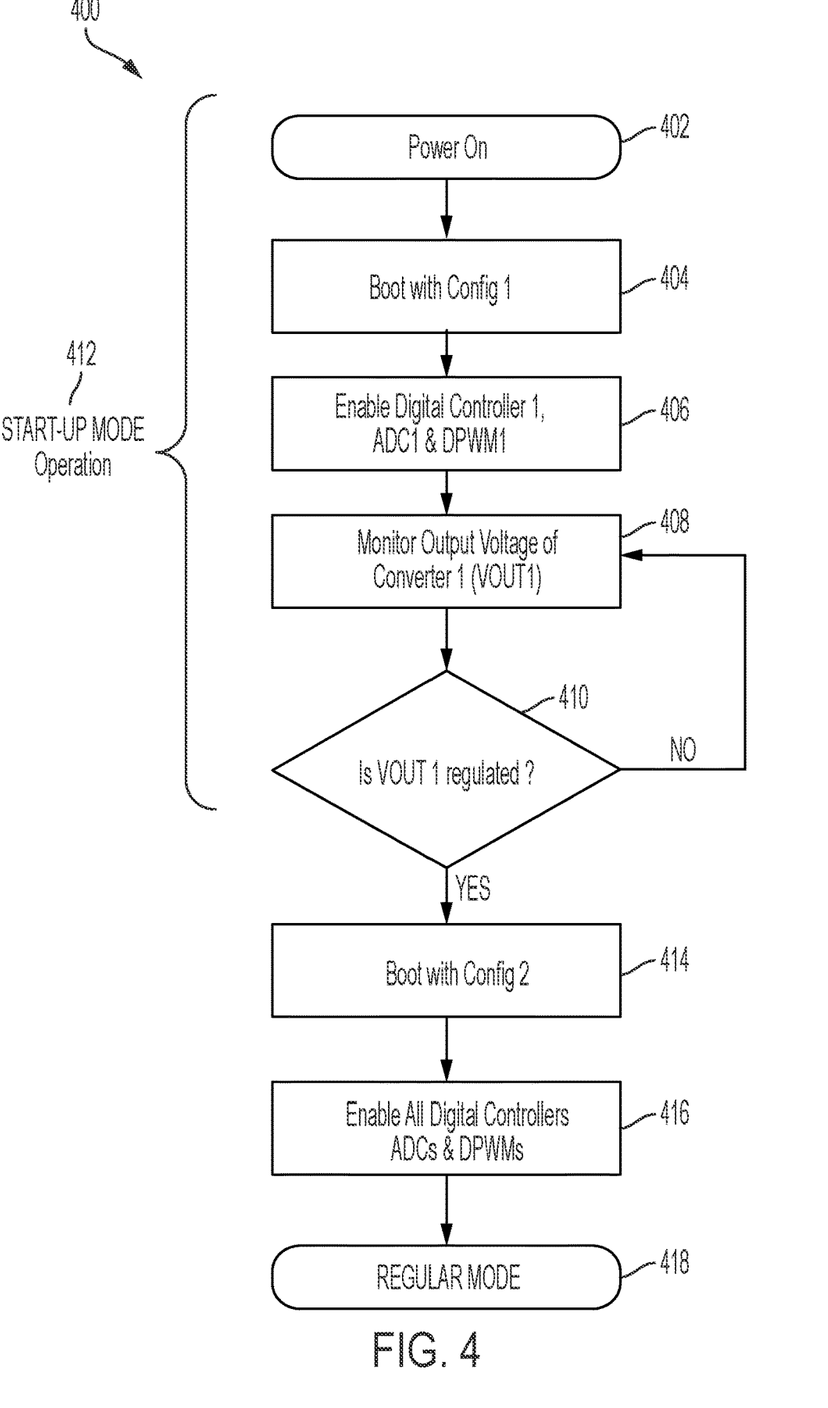
FIG. 4 is a flow diagram of a method, according to an embodiment of the present disclosure.

Referring now to FIG. 4, with continued reference to FIGS. 1-3. FIG. 4 shows a method 400 of configuring the multi-output power supply 220 of FIGS. 2 and 3 according to an embodiment. The method 400 is also described with respect to timing diagram 500 of FIG. 5, state transition diagram 600 of FIG. 6, and timing diagram 700 of FIG. 7.

Figure 5:
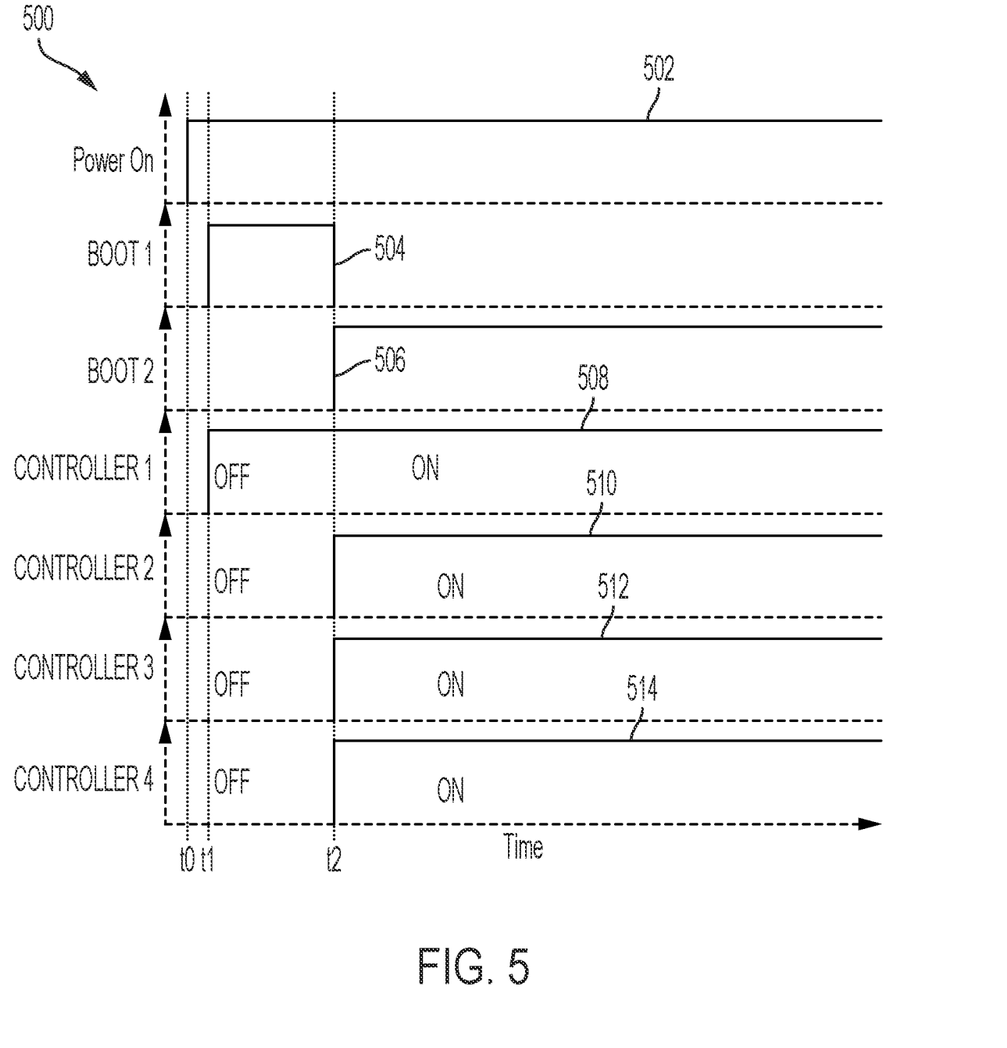
FIG. 5 is a timing diagram of controlling a multi-output power supply, according to an embodiment of the present disclosure.
Figure 6:
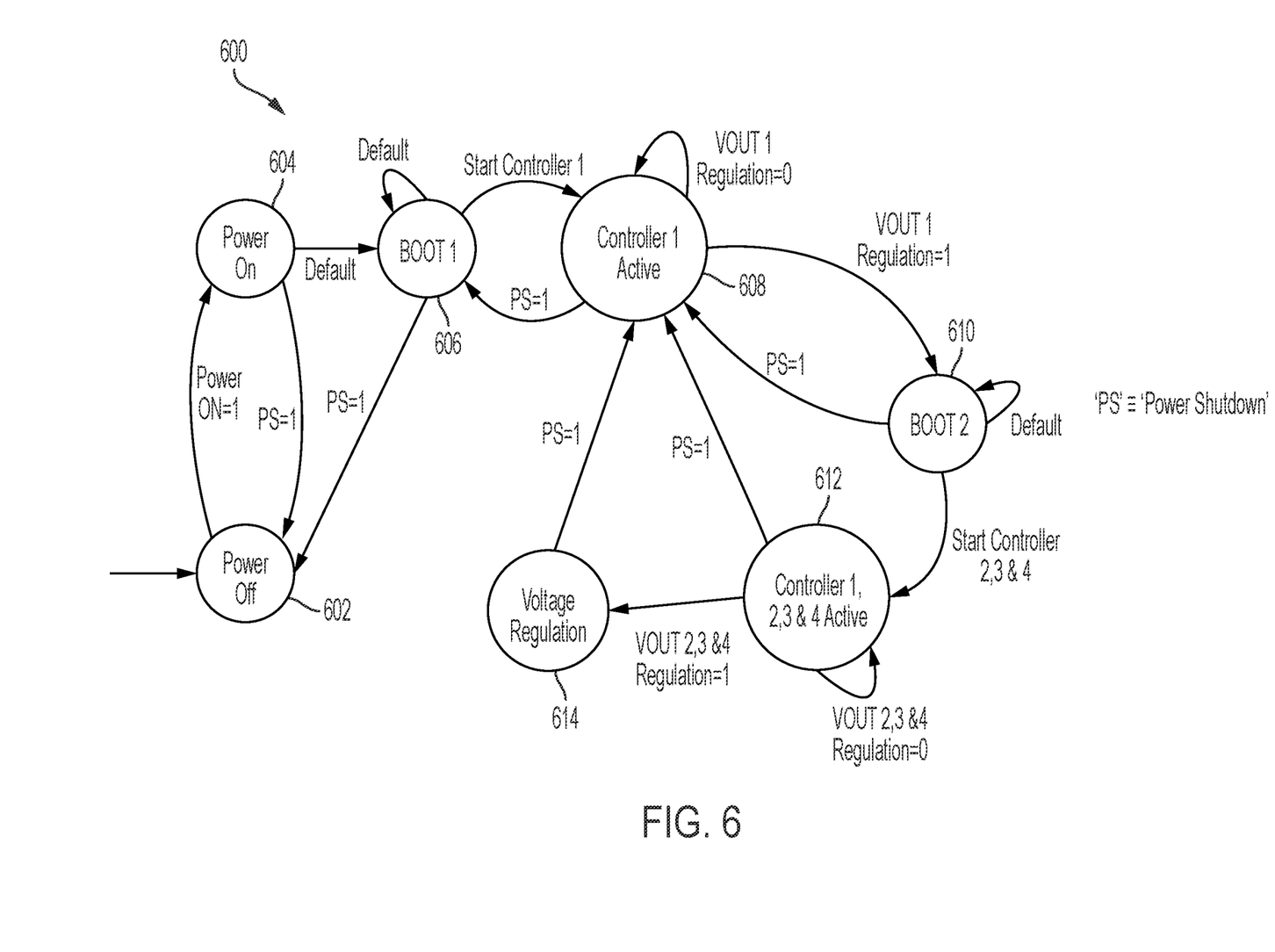
FIG. 6 is a state transition diagram of a power control sequence, according to an embodiment of the present disclosure.

At block 402, the multi-output power supply 220 is powered on by receiving power inputs 112 as depicted at power-on 502 transition from power-off state 602 to power-on state 604. At block 404, the power supply control 302 is booted with BOOT configuration 1 as depicted at BOOT_1 504 with a transition from power-on state 604 to BOOT_1 state 606. At block 406, the power supply control 302 enables modulation controller 320A, configurable digital pulse-width modulation circuit 322A, and analog-to-digital converter 324A, which results in the first voltage converter 304A transitioning from OFF to ON as depicted at Controller_1 508 and state transition from BOOT_1 state 606 to Controller_1 active state 608.

At block 408, the modulation controller 320A can monitor the output 305A using the analog-to-digital converter 324A. The modulation controller 320A can continue to monitor the output 305A at block 410 as part of a start-up mode of operation 412 until the output 305A meets a regulation threshold, such as reaching a predetermined minimum voltage level. At block 414, upon determining that the output 305A meets the regulation threshold, the power supply control 302 is booted with BOOT configuration 2 as depicted at BOOT_2 506 with a transition from Controller_1 active state 608 to BOOT_2 state 610. At block 416, the power supply control 302 enables all of the modulation controllers 320, configurable digital pulse-width modulation circuits 322, and analog-to-digital converters 324 as depicted with Controller_2 510, Controller_3 512, and Controller_4 514 switching from OFF to ON while Controller_1 508 remains ON. The transition is further illustrated as transitioning from BOOT_2 state 610 to Controller_1234 active state 612. The multi-output power supply 220 can transition to a regular mode of operation at block 418 upon outputs 305B reaching regulated states, as illustrated in the transition from Controller_1234 active state 612 to voltage regulation state 614. Upon detecting a power shutdown event at the power supply control 302, the power supply control 302 can transition back through Controller_1 active state 608 and BOOT_1 state 606 to power-off state 602.

Figure 7:
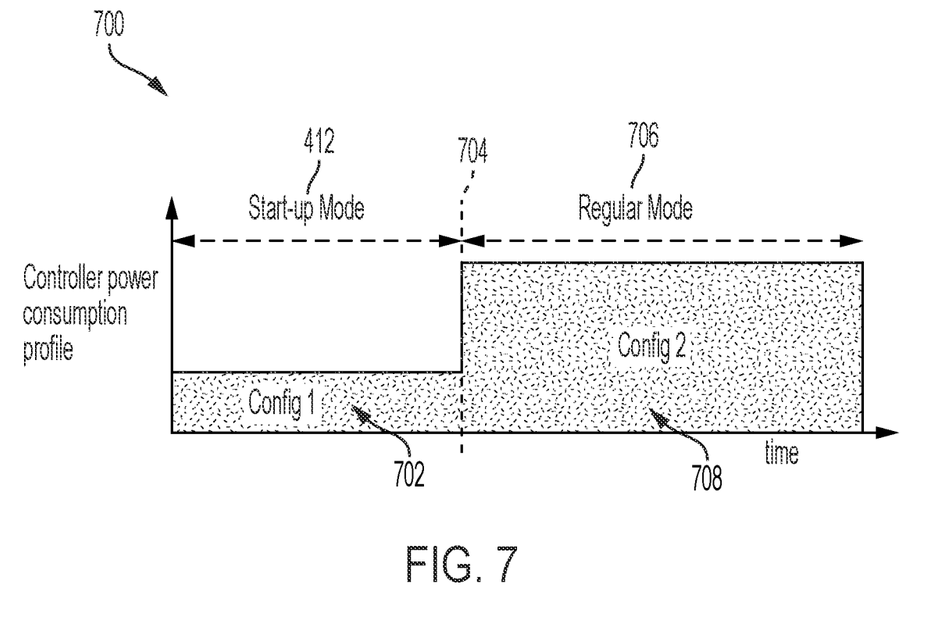
FIG. 7 is a timing diagram of a power consumption profile in a multi-output power supply control, according to an embodiment of the present disclosure.

The timing diagram 700 of FIG. 7 further illustrates how a BOOT configuration 1 power requirement 702 is reduced in the start-up mode of operation 412 during a start-up mode period until a bootstrap transition 704 to a regular mode of operation 706 is reached, where the regular mode of operation 706 corresponds to block 418 of FIG. 4. In the regular mode of operation 706, a BOOT configuration 2 power requirement 708 is higher than the BOOT configuration 1 power requirement 702. In the example of FIG. 7, the BOOT configuration 1 controller power requirement 702 is about 25% of the BOOT configuration 2 power requirement 708. It will be understood that other power ratios are possible depending upon the number of voltage converters 304 of FIG. 3 and other factors. The controller power consumption profile depicted in FIG. 7 illustrates an example of a power requirement for the power supply control 302 of FIG. 3. Reduced power consumption for the power supply control 302 can be supplied by the start-up bootstrap circuit 312 in start-up mode until the BOOT_1 state. Subsequently in regular operating mode, the full power requirement for the power supply control 302 is supplied by the regulated voltage of output 305A. This reduces the power requirements for the start-up bootstrap circuit 312, which enables the start-up bootstrap circuit 312 to be designed with less bulky and lower power rated components than would otherwise be needed.

Figure 8:
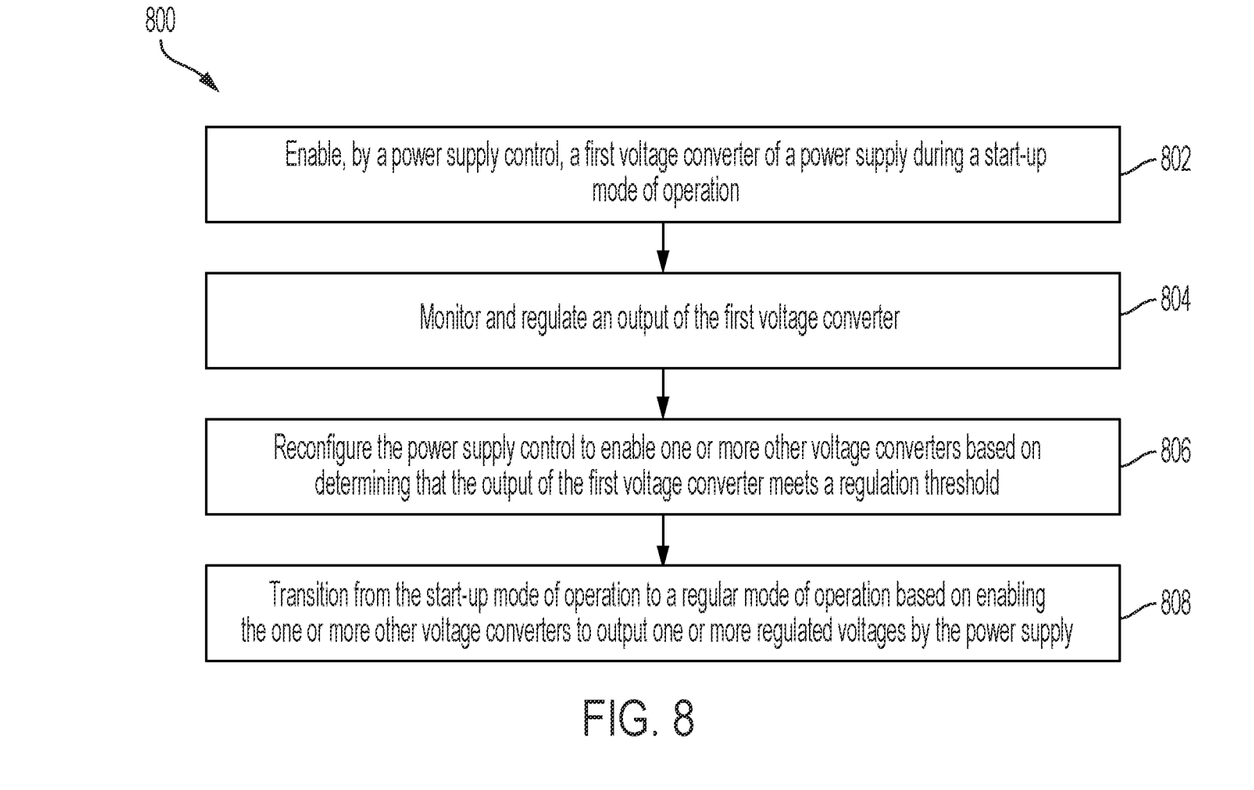
FIG. 8 is a flow diagram of a method, according to an embodiment of the present disclosure.

FIG. 8 is a flow diagram of a method 800, according to an embodiment of the present disclosure. The method 800 further summarizes a start-up sequence of a multi-output power supply, such as the multi-output power supply 220 of FIG. 2 and is described with respect to FIGS. 1-8. The power supply control 302 can be configured to perform a plurality of operations as described with respect to the method 800.

At block 802, the power supply control 302 of the multi-output power supply 220 can enable the first voltage converter 304A during the start-up mode of operation 412. At block 804, the power supply control 302 can monitor and regulate the output 305A of the first voltage converter 304A. At block 806, the power supply control 302 can be reconfigured to enable one or more other voltage converters 304B based on determining that the output 305A of the first voltage converter 304A meets a regulation threshold. At block 808, the power supply control 302 can transition from the start-up mode of operation 412 to a regular mode of operation 706 based on enabling the one or more other voltage converters 304B to output one or more regulated voltages.

In embodiments, the power supply control 302 can access the non-volatile storage device 334 that includes a first set of configuration data 336 and at least a second set of configuration data 338, which may include multiple subsets of data. The first voltage converter 304A can be enabled based on the power supply control 302 receiving the first set of configuration data 336 from the non-volatile storage device 334. The power supply control 302 can be reconfigured to enable the one or more other voltage converters 304B based on the power supply control 302 receiving the second set of configuration data 338 from the non-volatile storage device 334. The regular mode of operation 706 can include the first voltage converter 304A meeting the regulation threshold and the one or more other voltage converters 304B meeting one or more corresponding regulation thresholds. Transitioning from the regular mode of operation 706 to the start-up mode of operation 412 can be performed prior to depowering the multi-output power supply 220 based on the power supply control 302 detecting a power shutdown event. Further, the power supply control 302 can be configured to monitor and regulate each output of two or more voltage converters 304, for instance, as part of turn-on/turn-off sequence.

While the above description has described FIGS. 4-8 in a particular order, it should be appreciated that unless otherwise specifically required in the attached claims that the ordering of the steps may be varied.

Figure 9:
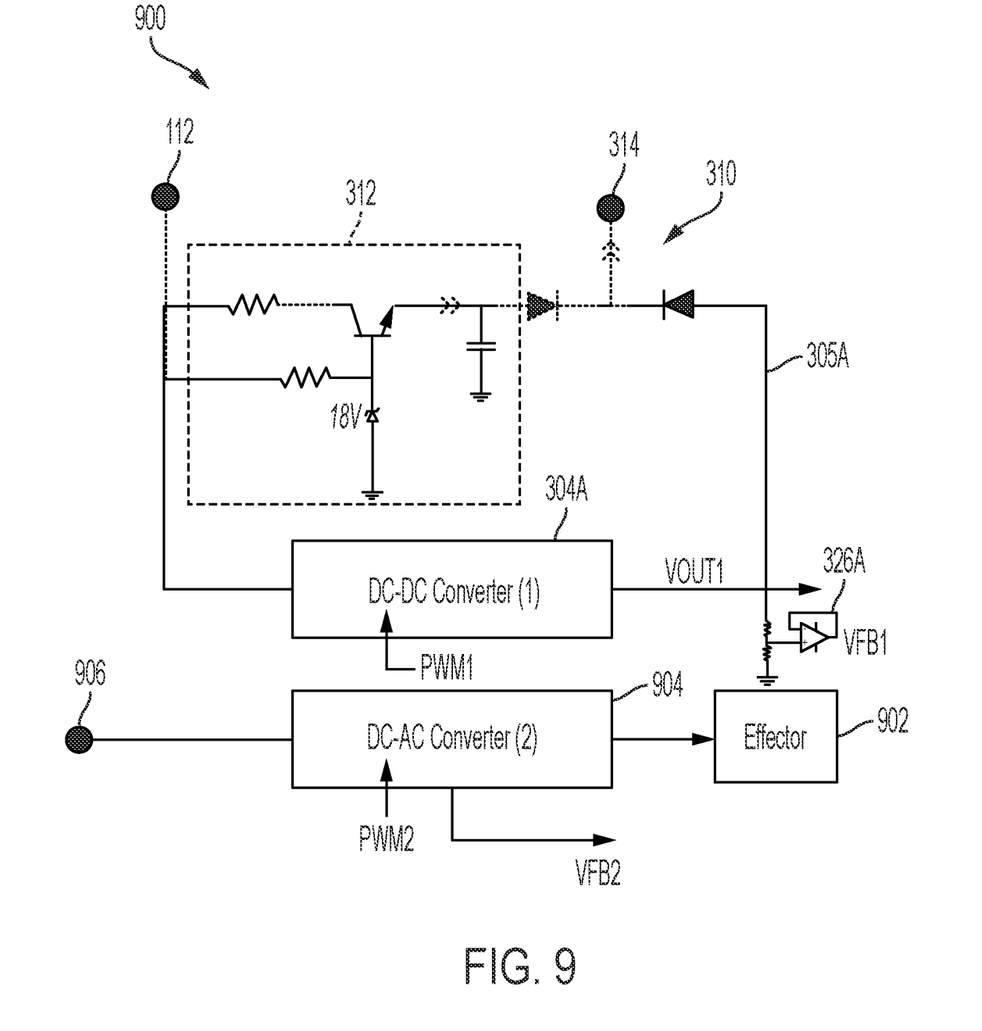
FIG. 9 is a block diagram of a motor drive, according to an embodiment of the present disclosure.

FIG. 9 is a block diagram of a motor drive 900, according to an embodiment of the present disclosure. The example of FIG. 9 illustrates an alternate embodiment where the power supply control 302 of FIG. 3 can be used to sequence start-up bootstrap power control for an effector 902, such as an electric motor. Similar to the example of FIG. 3, the motor drive 900 includes a voltage converter 304A that provides output 305A to diode-or circuit 310. The diode-or circuit 310 can also receive supply initial bias voltage from start-up bootstrap circuit 312, which may be powered by a power input of the power inputs 112. Buffer circuit 326A can provide feedback to the power supply control 302. In the example of FIG. 9, a DC-AC converter 904 can also be controlled by the power supply control 302 with method 800, for example to power the effector 902, which can be one of the effectors 104 of FIGS. 1 and 2. The DC-AC converter 904 can receive input power from a DC power source 906. In some embodiments, the DC power source 906 can be the output 305A or can be based on the output 305A.

Figure 10:
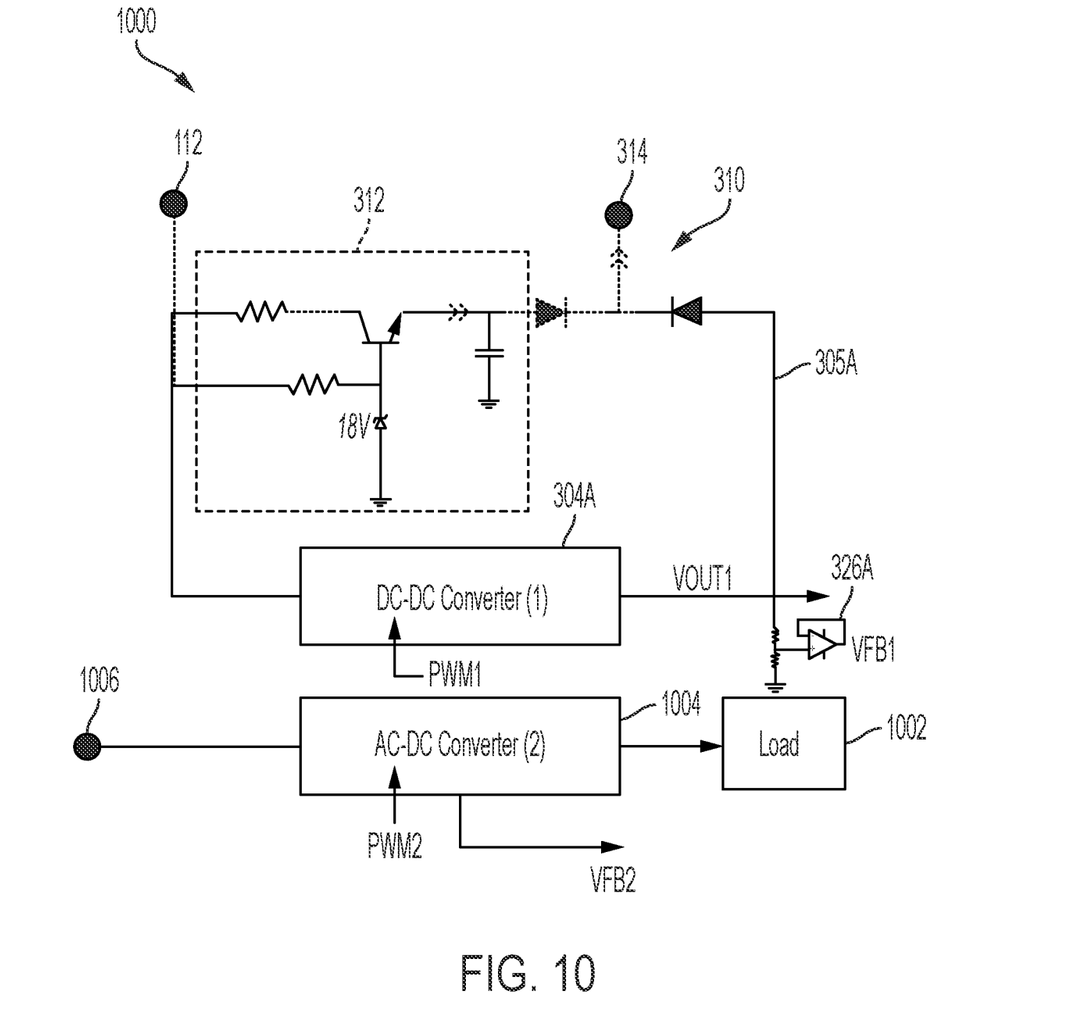
FIG. 10 is a block diagram of a front-end converter, according to an embodiment of the present disclosure.

FIG. 10 is a block diagram of a front-end converter 1000, according to an embodiment of the present disclosure. The example of FIG. 10 illustrates an alternate embodiment where the power supply control 302 of FIG. 3 can be used to sequence start-up bootstrap power control for a load 1002, which may require a regulated DC voltage. Similar to the example of FIGS. 3 and 9, the front-end converter 1000 includes a voltage converter 304A that provides output 305A to diode-or circuit 310. The diode-or circuit 310 can also receive supply initial bias voltage from start-up bootstrap circuit 312, which may be powered by a power input of the power inputs 112. Buffer circuit 326A can provide feedback to the power supply control 302. In the example of FIG. 10, an AC-DC converter 1004 can also be controlled by the power supply control 302 with method 800, for example to power the load 1002. The AC-DC converter 1004 can receive input power from an AC power source 1006. Other variations are contemplated with additional converter types and configurations.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power supply, comprising:
a start-up bootstrap circuit that supplies an initial voltage to a first voltage converter;
a plurality of voltage converters comprising the first voltage converter and one or more other voltage converters; and
a power supply control comprising an integrated circuit with at least one modulation controller, at least one analog-to-digital converter, and at least one pulse-width modulation circuit, the integrated circuit configured to perform a plurality of operations comprising:
enabling the first voltage converter during a start-up mode of operation using the start-up bootstrap circuit;
monitoring through the at least one modulation controller using the at least one analog-to-digital converter and regulating an output of the first voltage converter through the at least one modulation controller using the at least one pulse-width modulation circuit;
reconfiguring the power supply control to enable the one or more other voltage converters based on determining that the output of the first voltage converter meets a regulation threshold; and
transitioning from the start-up mode of operation to a regular mode of operation based on enabling the one or more other voltage converters to output one or more regulated voltages by the power supply using a non-volatile storage device.

2. The power supply of claim 1, wherein the non-volatile storage device comprises a first set of configuration data and at least a second set of configuration data.

3. The power supply of claim 2, wherein enabling the first voltage converter is based on the power supply control receiving the first set of configuration data from the non-volatile storage device.

4. The power supply of claim 3, wherein reconfiguring the power supply control to enable the one or more other voltage converters is based on the power supply control receiving the second set of configuration data from the non-volatile storage device.

5. The power supply of claim 1, wherein the power supply control is configured to transition from the regular mode of operation to the start-up mode of operation prior to depowering based on detecting a power shutdown event.

6. The power supply of claim 1, wherein the regular mode of operation comprises the first voltage converter meeting the regulation threshold and the one or more other voltage converters meeting one or more corresponding regulation thresholds.

7. The power supply of claim 1, further comprising:
a diode-or circuit coupled to the output of the first voltage converter, wherein an output of the diode-or circuit is coupled to a local regulator configured to power the power supply control; and
wherein the start-up bootstrap circuit is coupled to the diode-or circuit and a power input.

8. The power supply of claim 1, wherein the power supply control is configured to monitor and regulate each output of two or more voltage converters.

9. The power supply of claim 1, wherein each of the one or more other voltage converters is independently controlled.

10. The power supply of claim 1, wherein the output of the first voltage converter provides input power to at least one of the one or more other voltage converters.

11. A method comprising:
supplying, by a start-up bootstrap circuit, an initial voltage to a first voltage converter;
enabling, by a power supply control of a power supply, the first voltage converter during a start-up mode of operation using the start-up bootstrap circuit, wherein the power supply control comprises an integrated circuit with at least one modulation controller, at least one analog-to-digital converter, and at least one pulse-width modulation circuit;
monitoring through the at least one modulation controller using the at least one analog-to-digital converter and regulating an output of the first voltage converter through the at least one modulation controller using the at least one pulse-width modulation circuit;
reconfiguring the power supply control to enable one or more other voltage converters based on determining that the output of the first voltage converter meets a regulation threshold; and
transitioning from the start-up mode of operation to a regular mode of operation based on enabling the one or more other voltage converters to output one or more regulated voltages by the power supply using a non-volatile storage device.

12. The method of claim 11, wherein
the non-volatile storage device comprises a first set of configuration data and a second or more set of configuration data.

13. The method of claim 12, wherein enabling the first voltage converter is based on the power supply control receiving the first set of configuration data from the non-volatile storage device.

14. The method of claim 13, wherein reconfiguring the power supply control to enable the one or more other voltage converters is based on the power supply control receiving the second set of configuration data from the non-volatile storage device.

15. The method of claim 11, further comprising:
transitioning from the regular mode of operation to the start-up mode of operation prior to depowering based on detecting a power shutdown event.

16. The method of claim 11, wherein the regular mode of operation comprises the first voltage converter meeting the regulation threshold and the one or more other voltage converters meeting one or more corresponding regulation thresholds.

17. The method of claim 11, further comprising:
delivering power from a power input to the start-up bootstrap circuit coupled to a diode-or circuit;
delivering power from the first voltage converter to the diode-or circuit; and
providing power from an output of the diode-or circuit to a local regulator configured to power the power supply control.

18. The method of claim 11, further comprising:
monitoring and regulating each output of two or more voltage converters by the power supply control.

19. The method of claim 11, wherein each of the one or more other voltage converters is independently controlled.

20. The method of claim 11, wherein the output of the first voltage converter provides input power to at least one of the one or more other voltage converters.

* * * * *